United States Patent [19]

Schremmer et al.

[11] Patent Number: 5,002,422
[45] Date of Patent: Mar. 26, 1991

[54] DUAL ANGULAR ADJUSTMENT DEVICE FOR COARSE AND FINE ANGULAR ROTATION OF A SHAFT RELATIVE TO A RELEASABLY CONNECTABLE COMPONENT

[75] Inventors: Gottfried Schremmer, Tamm; Helmut Patzelt, Kernen-Stetten, both of Fed. Rep. of Germany

[73] Assignee: Daimler-Benz AG, Fed. Rep. of Germany

[21] Appl. No.: 366,347

[22] Filed: Jun. 15, 1989

Related U.S. Application Data

[63] Continuation of Ser. No. 178,927, Apr. 7, 1988, abandoned.

[30] Foreign Application Priority Data

Apr. 10, 1987 [DE] Fed. Rep. of Germany ....... 3712195

[51] Int. Cl.$^5$ .............................. F16B 7/04; B62D 1/18
[52] U.S. Cl. ........................................ 403/359; 403/4;
403/259; 403/365; 74/552; 280/775
[58] Field of Search ............... 403/359, 259, 355, 365,
403/1, 4; 74/552; 280/775, 279

[56] References Cited

U.S. PATENT DOCUMENTS

| 1,511,910 | 10/1924 | Royce | 403/4 |
|---|---|---|---|
| 1,598,767 | 9/1926 | Frankenberger | 403/359 |
| 2,236,674 | 4/1941 | Davy | 74/552 |
| 3,832,076 | 8/1974 | Gehrke | 403/359 |
| 4,306,466 | 12/1981 | Coveney | 74/552 X |
| 4,616,673 | 10/1986 | Bondar | 403/359 X |
| 4,624,596 | 11/1986 | Eckendorff | 403/4 |
| 4,662,775 | 5/1987 | Faul | 403/365 |
| 4,819,961 | 4/1989 | Henigue | 280/775 |

FOREIGN PATENT DOCUMENTS 0148794  7/1985  European Pat. Off. .

Primary Examiner—Peter M. Cuomo
Attorney, Agent, or Firm—Evenson, Wands, Edwards, Lenahan & McKeown

[57] ABSTRACT

A device for adjusting the angular position of rotation of a steering wheel hub of a motor vehicle relative of a steering shaft utilizing a bushing which is located between these parts and connected to each of these by sets of teeth distributed uniformly over the inner and outer periphery of the bushing and wherein these teeth offer a large number of possibilities of angular adjustment as a result of the engagement of one set of teeth with the steering wheel hub for a coarse adjustment and as a result of the engagement of the other set of teeth with the steering shaft for an even larger possibility of minor angular adjustment.

9 Claims, 3 Drawing Sheets

DUAL ANGULAR ADJUSTMENT DEVICE FOR COARSE AND FINE ANGULAR ROTATION OF A SHAFT RELATIVE TO A RELEASABLY CONNECTABLE COMPONENT

This is a continuation of application Ser. No. 178,927, filed Apr. 7, 1988, now abandoned.

BACKGROUND AND SUMMARY OF THE INVENTION

The invention relates to a device for the fine adjustment of the angular rotative position of a shaft relative to a component releaseably connected thereto through a coupling bushing means which can be fixed on said shaft by means of a toothed surface uniformly provided on a periphery therebetween, and which can be positioned in cut outs of identical shape on the component by means of a further uniformly toothed surface wherein a large number of possibilities of angular adjustment between the shaft and the component are possible.

European Preliminary Publication 0,148,794 describes a device, by means of which the angular position of a steering-wheel hub relative to a steering shaft, coaxial therewith, is obtained utilizing a bushing which is arranged between the shaft and hub, and is rotationally fixed to the steering shaft by means of a set of teeth and is displaceable on this connection in an axial direction. The bushing rotates the steering wheel hub by means of helically extending tooth flanks of a further toothed connection with the hub, wherein the steering shaft is thus caused to rotate relative to the steering wheel hub.

This device makes it possible to cover a large angular range, which cannot be obtained by just changing the bushing on the steering shaft by the amount of one tooth for the exact alignment of the steering wheel hub relative to the steering shaft to which the vehicle wheels to be steered are connected. Rather, the solution described therein involves a large number of interfacing parts, and is therefore relatively expensive, since it is necessary to have both a drive for the axial displacement of the bushing and a complicated helical shape of the tooth flanks on the steering wheel hub, as well as having this complicated shape be given to the teeth of the bushing with which it engages. Moreover, the adjusting mechanism as a whole requires a large dimensional depth for the structure.

An object of the instant invention is to provide a simple means to increase the number of possibilities of angular adjustment beyond those afforded by the normal toothed connection of a steering wheel shaft to a bushing, connected co-axially and releaseably between a steering wheel hub and shaft.

The object is achieved by having a number of teeth in the toothed surface between the steering shaft and the bushing be much greater than a number of teeth in a toothed surface between the bushing and the steering wheel hub, whereupon a division of the larger number by the smaller number produces a remainder after the decimal point not equal to zero.

Simply by changing the position of the bushing on the steering shaft and also in the steering wheel hub, the total number of possible angular adjustments increases to a value which is obtained from the possibilities of angular adjustment by means of one toothed connection multiplied by the different possibilities of angular adjustment of the other toothed connection, as a result of which a sufficiently exact alignment of the steering wheel hub on the steering shaft is achieved quite simply and with low costs.

Since certain tolerances have to be allowed in the production of toothed connections, the bushing is braced by resting it frictionally against sloping faces so as to be able to transmit the steering torque if overloading occurs, as for example, due to an attempt to manipulate the steering wheel lock by over-rotating the steering wheel. The bracing can additionally be by plural faces on two flanks of the bushing.

Additionally, it is possible to have the teeth, provided between the steering wheel hub and bushing, be either radially or axially engaged. It is also desirable to have a spring bracing the bushing, as well as having the bushing and spring located between the steering wheel hub and shaft, for transporting and ease of assembly purposes.

It is also advantageous to the teeth on the steering wheel hub, which has relatively few teeth, be cast onto the steering wheel hub and be produced as unitary aluminum diecasting, since it is thereby possible to ensure production accuracy.

Other objects, advantages and novel features of the present invention will become apparent from the following detailed description of the invention when considered in conjunction with the accompanying drawings.

DETAILED DESCRIPTION OF THE DRAWINGS

Figure 1:
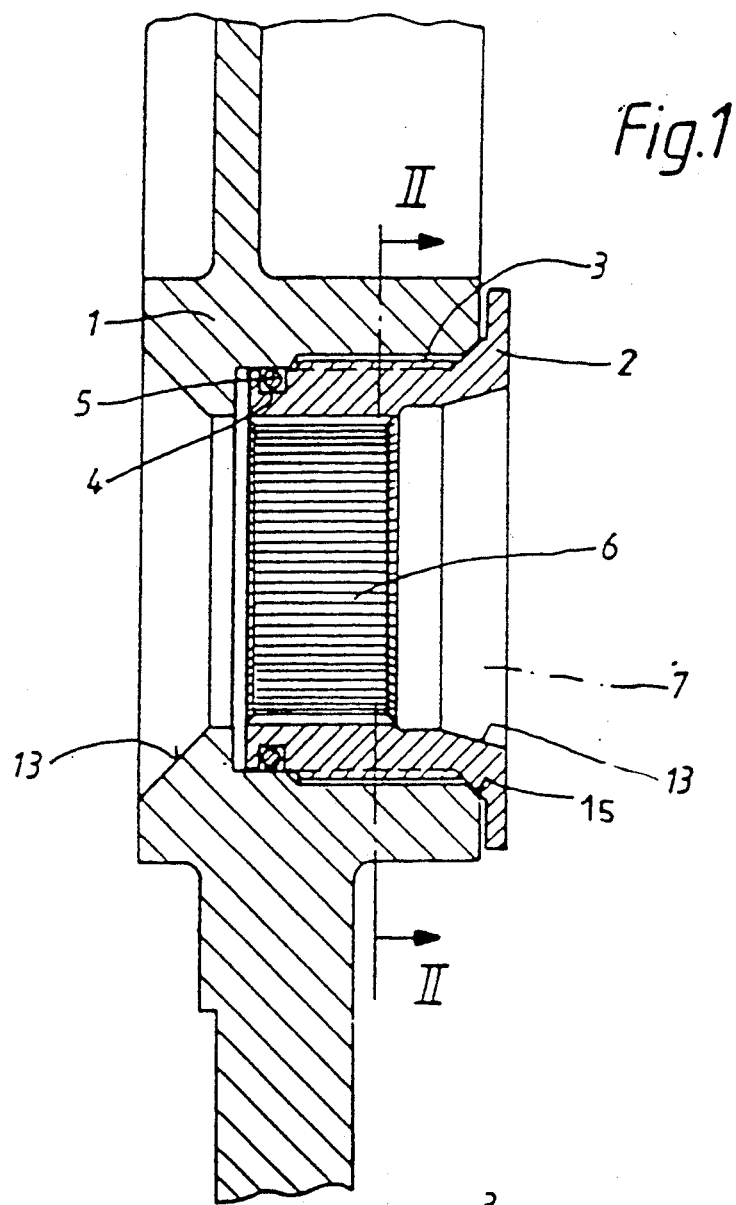
FIG. 1 shows a device with a bushing having a set of teeth on the inner surface and on the outer periphery.
Figure 2:
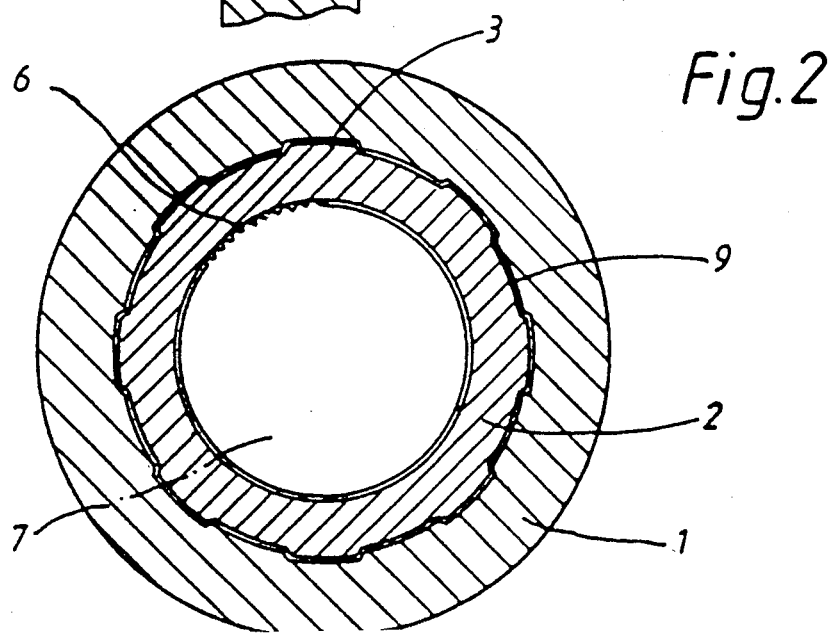
FIG. 2 shows a section along the line II—II of FIG. 1.

FIGS. 1 and 2 show a steering wheel hub 1 and a bushing 2 which is inserted from an underside of the bore (to the left). The bushing 2 is engaged with the hub 1 by a set of teeth 3 distributed uniformly over the periphery and mating with corresponding teeth 9 on the hub 1.

In order to keep the bushing 2 attached during transport or assembly so it will not fall out, a snap ring spring 5 is received in the bushing 2 and is braced slightly against the bore wall of the steering wheel hub 1.

Along its inner bore surface, the bushing 2 has a further set of inwardly facing teeth 6 which fixedly secure a suitably serrated steering shaft 7 in an non-rotational manner. The bushing 2 makes it possible to position the steering wheel hub 1 in eight angular positions of rotation relative to the bushing 2, due to the eight different relative rotational alignments of the cooperating sets of teeth 3 therebetween. The bushing 2 can be positioned on the steering shaft 7 with sixty-six different possibilities of angular adjustment according to the sixty-six engaging teeth of its set of teeth 6.

In this example, the bushing 2 is designed with two radially extending peripheral sets of teeth 3 and 6. The steering wheel hub 1 which has only a few teeth 9 has advantageously been cast in one piece with the steering wheel itself.

During the assembly of the steering wheel hub 1 on the steering shaft 7, the steering wheel hub 1 is first slipped onto the steering shaft 7 as assembled together with the inserted bushing 2. At that time, a visual check is made as to whether, in this position, the steering wheel is aligned straight with the vehicle wheels. If there is a rotative offset which cannot be compensated by rotating the bushing 2, relative to the steering wheel hub 1 by the amount of an entire tooth 3, since the amount of the offset is less than arcuate distance between two adjoining teeth 3, then an intermediate value between two teeth of the sets of teeth 3 can be obtained by pulling off the steering wheel hub 1 together with the bushing 2 and rotatably shifting the steering wheel hub 1 and the bushing 2 as unit in their angular position on steering shaft 7 by an amount of one or more teeth of the sixty-six teeth 6. This is possible since the number of possibilities of angular adjustment by means of the set of teeth 6 is not an integral multiple of the number of possibilities of angular adjustment by means of the other set of teeth 3. Consequently, the original rotative offset is converted into at most a very slight deviation in adjustment as a function of the arbitrarily selectable toothing ratios or possibilities of angular adjustment of the sets of teeth 3 and 6.

After the steering wheel hub 1 is pushed onto the steering shaft 7, together with the bushing 2, to assume the new angular position of rotation which has little or no relative offset, the steering wheel hub 1 is subsequently fastened on the steering shaft 7 in the manner shown in more detail in FIG. 3.

Figure 3:
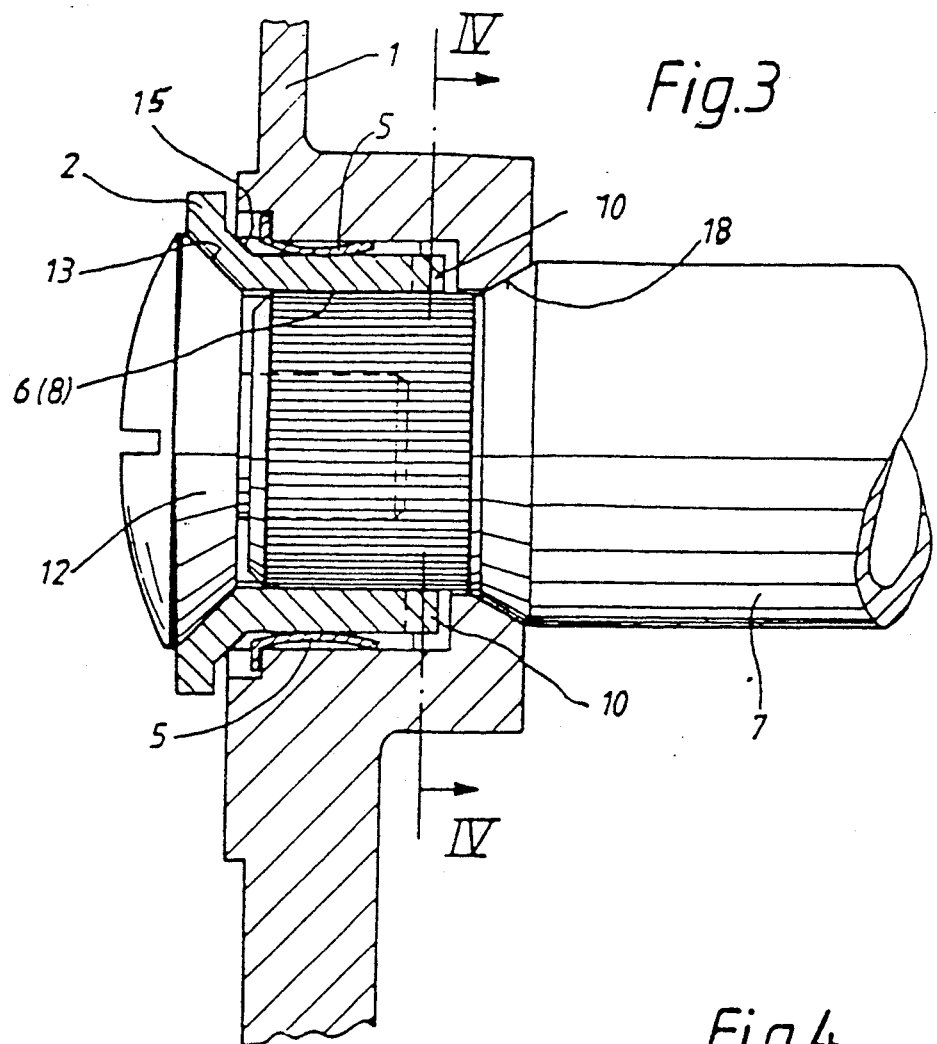
FIG. 3 shows a device with a bushing engaged in a steering wheel hub by means of an end set of teeth.
Figure 4:
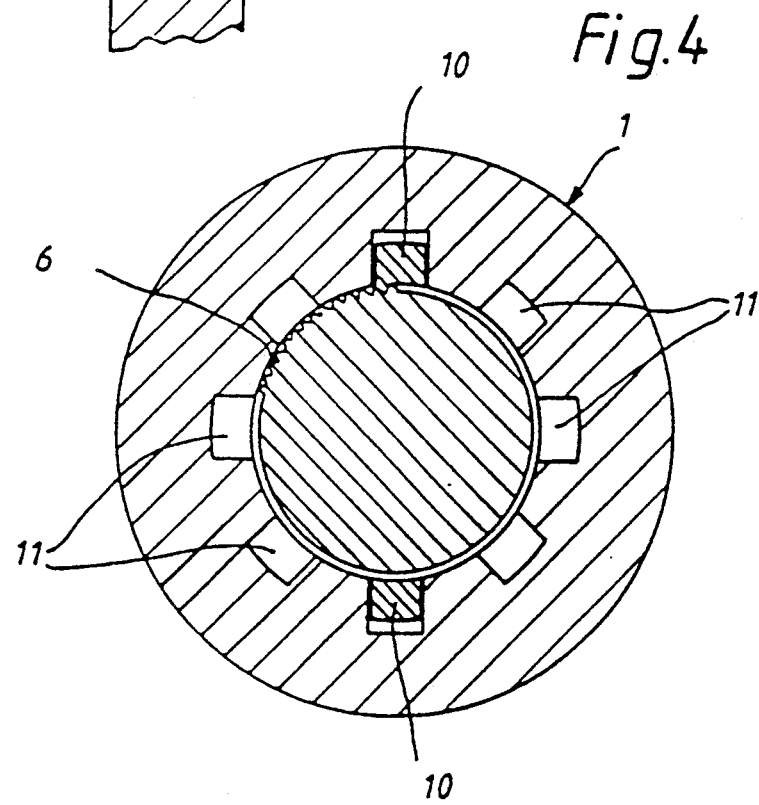
FIG. 4 shows a section along the line IV—IV of FIG. 3.

In the embodiment of FIGS. 3 and 4, a bushing 2 has, in addition to the internally facing peripheral bore set of teeth 6 engaging with a steering shaft 7, an axially end facing set of two teeth 10 for engaging into a plurality of eight different cut outs 11 in steering wheel hub 1. These sets of two teeth 10 in cooperation with eight different cut outs 11, produce eight different angular positions. In general, the number of possible angular adjustments between the bushing 2 and the hub Can be selected freely, according to the number of cut outs 11 provided in the hub. Again, as in FIG. 1, minor angular offset can be accommodated between internal teeth 6 and shaft 7.

In this embodiment, the bushing 2 is held braced slightly in the steering wheel hub 1 by means of two leaf springs 5 to allow for transportation and assembly of the hub 1 to shaft 7. After correct adjustment of the steering wheel hub 1 and bushing 2 on the steering shaft 7, the are secured frictionally by means of a countersunk screw 12 screwed into the steering shaft 7. Tightening of screw 12 causes bushing 2 to be positioned by resting against sloping face 13 of the countersunk screw 12 and face 15 of hub 1, while hub 1 rests against slope 18 on shaft 7. This is necessary because certain tolerances have to be allowed in the production of the various sets of teeth, as a result of which a slight radial play can occur between the parts. However, if an upper limiting value of the effect of force is exceeded during the rotation of the steering wheel, the tooth flanks of the sets of teeth 3 and 6 are supported positively on one another.

This bushing 2 also allows inexpensive adaptation to different steering shaft or steering wheel hub diameters, and in this case the steering wheel hub 1 and the steering shaft 7 remain unaffected by the adaptation. Only the relative thickness of the bushing 2 and/or its inner and/or outer diameters need be changed.

Figure 5:
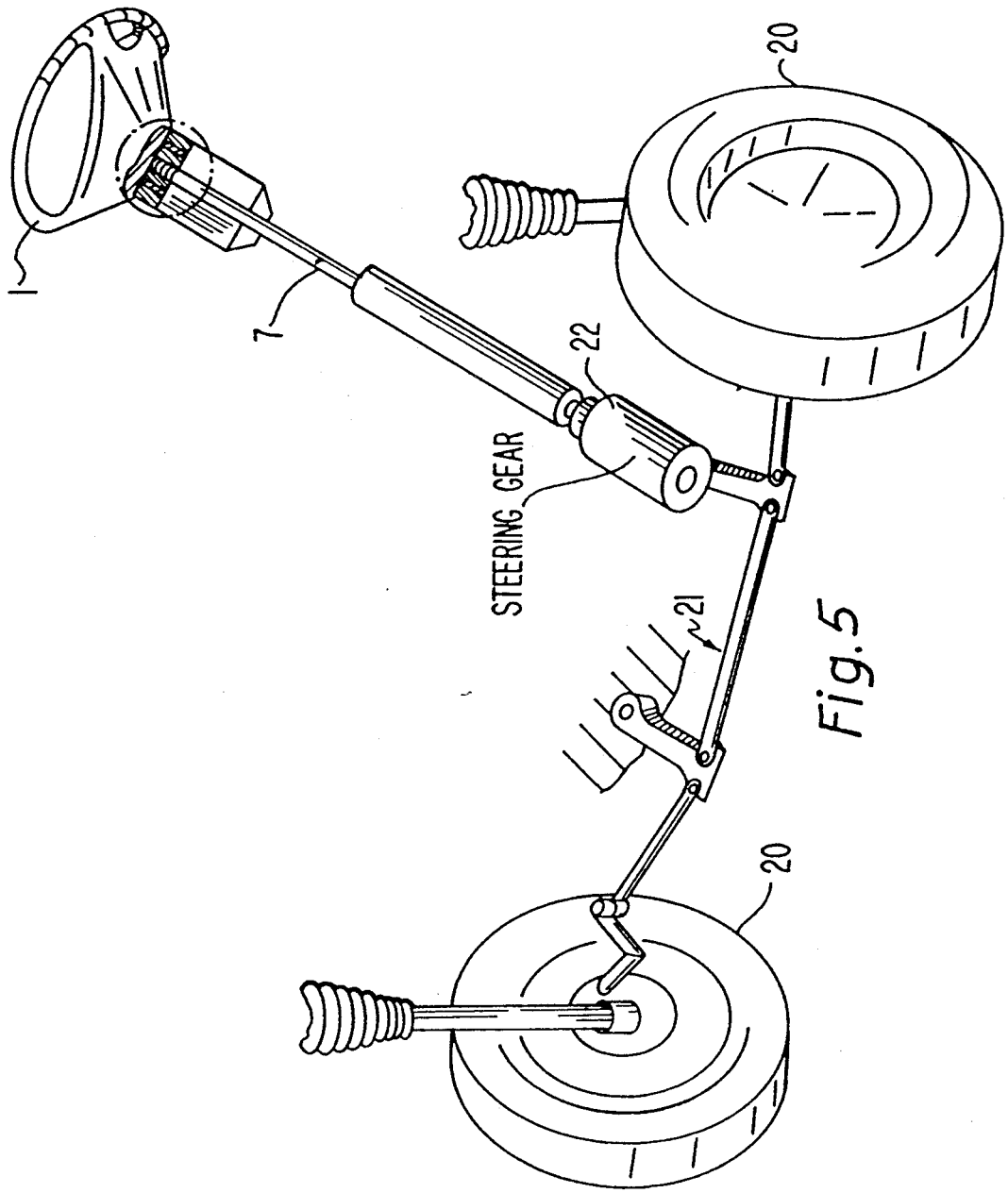
FIG. 5 shows the adjustment device of FIGS. 1 and 2 as it was used to connect a vehicle steering wheel to the steerable vehicle road wheels.

While the internal teeth 6 are described as being on the bushing 2 for wedging action onto the steering shaft 7, cooperating teeth could be provided on the shaft for intermeshing with these internal teeth 6. The above described adjusting device is utilized in a vehicle steering system such as shown in FIG. 5 wherein the steering wheel is connected to the steering shaft 7 by the aforementioned adjustment device and wherein the steering shaft turns the vehicle road wheels 20 through a conventional steering gear 22 and linkage 21. Alternatively, teeth 6 on the shaft could be wedged into a smooth surface on the bushing 2. No separate figure for this is shown, since the assembled bushing and shaft under these alternatives would appear as shown in FIG. 4.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A mechanism for connecting a vehicle steering wheel hub in proper orientation to a steering linkage means for turning the road wheels of a vehicle, comprising:

a steering wheel shaft;

steering linkage means connecting said steering wheel shaft to at least one of said road wheels;

means for providing a fine adjustment of an angular rotative position of the vehicle steering wheel shaft relative to the vehicle steering wheel hub, said vehicle steering wheel hub being releasably connected to said vehicle steering wheel shaft through a coupling bushing means which can be non-rotatably fixed on said vehicle steering wheel shaft by means of a toothed surface uniformly provided on a periphery therebetween and which can be non-rotatably positioned in cut outs of identical shape on the vehicle steering wheel hub by means of a further similarly uniformly toothed surface, wherein said bushing means and said vehicle steering wheel hub are braced relative to one another by a spring inserted therebetween, wherein a large number of possibilities of angular adjustment between the vehicle steering wheel shaft and the vehicle steering wheel hub are possible by having teeth in the toothed surface between the vehicle steering wheel shaft and the bushing means be much greater than a number of teeth in the tooth surface between the bushing means and the vehicle steering wheel hub to allow for proper orientation of the steering wheel with the vehicle road wheels, and wherein a ratio comparison of the greater number of teeth by the lesser number is a fractional number.

2. The apparatus according to claim 1, wherein said bushing means can be braced frictionally against axial sloping faces between the vehicle steering wheel hub and the vehicle steering wheel shaft.

3. The apparatus according to claim 1, wherein the toothed surface provided between the bushing means and the vehicle steering wheel hub engage in an axial direction.

4. The apparatus according to claim 1, wherein the vehicle steering wheel hub has a set of teeth and consists of an aluminum diecasting produced in one piece.

5. The apparatus according to claim 1, wherein the toothed surface between the bushing means and the vehicle steering wheel hub comprise cooperating teeth on the vehicle steering wheel hub and the bushing means.

6. The apparatus according to claim 5, wherein one of the vehicle steering wheel hub or bushing means has a lesser number of teeth than the other.

7. The apparatus according to claim 6, wherein the toothed surface between the bushing means and the vehicle steering wheel shaft comprise cooperating teeth on the bushing means and the vehicle steering wheel shaft.

8. The apparatus according to claim 5, wherein the toothed surface between the bushing means and the vehicle steering wheel shaft comprise cooperating teeth on the bushing means and the vehicle steering wheel shaft.

9. The apparatus according to claim 1, wherein the toothed surface between the bushing means and the vehicle steering wheel shaft comprise cooperating teeth on the bushing means and the vehicle steering wheel shaft.

* * * * *